(12) United States Patent
Tian et al.

(10) Patent No.: US 8,434,905 B2
(45) Date of Patent: May 7, 2013

(54) LED BASED PRECISION APPROACH PATH INDICATOR

(76) Inventors: Rongsheng Tian, Santa Clara, CA (US); Yong Tian, Santa Clara, CA (US)

( * ) Notice: Subject to any disclaimer, the term of this patent is extended or adjusted under 35 U.S.C. 154(b) by 1019 days.

(21) Appl. No.: 12/590,771

(22) Filed: Nov. 12, 2009

(65) Prior Publication Data

US 2010/0123398 A1    May 20, 2010

Related U.S. Application Data

(60) Provisional application No. 61/199,254, filed on Nov. 15, 2008.

(51) Int. Cl.
*H05B 37/00* (2006.01)
*F21V 1/00* (2006.01)
*G01B 11/26* (2006.01)

(52) U.S. Cl.
USPC ...... 362/276; 362/235; 362/249.02; 362/470; 362/472; 340/952; 340/950

(58) Field of Classification Search ............ 362/249.02, 362/235, 800, 470, 472
See application file for complete search history.

(56) References Cited

U.S. PATENT DOCUMENTS

| | | | | |
|---|---|---|---|---|
| 4,064,242 A * | 12/1977 | Schmidt | | 514/204 |
| 4,183,078 A * | 1/1980 | Kidd | | 362/231 |
| 4,430,695 A * | 2/1984 | Payne et al. | | 362/277 |
| 4,532,512 A * | 7/1985 | Tanner | | 340/950 |
| 5,287,104 A * | 2/1994 | Shemwell | | 340/952 |
| 7,645,053 B2 * | 1/2010 | Machi et al. | | 362/241 |
| 7,717,594 B2 * | 5/2010 | Clark | | 362/471 |
| 8,038,319 B2 * | 10/2011 | Bailey | | 362/245 |

* cited by examiner

*Primary Examiner* — Anabel Ton
(74) *Attorney, Agent, or Firm* — Bright IP Law Offices

(57) ABSTRACT

A precision approach path indicator system (PAPI) including multiple LHA indicators and power sources. Each LHA indicator comprises several assembly modules, with each module made up of several red and white LEDs, several collimating lens, one optical combiner, and one projection lens set. From a side view of the module, the red LEDs are placed on top of white LEDs, with a collimating lens in front of each LED. The optical combiner is in front of both the red and white LEDs, slightly above the white LEDs in vertical placement. The optical combiner has a reflective coating on the bottom surface, and a red light filter coating on the projection surface. The combined beam of light is projected out through a projection lens at front of the assembly module.

20 Claims, 2 Drawing Sheets

LED BASED PRECISION APPROACH PATH INDICATOR

REFERENCE TO RELATED APPLICATIONS

The present application claims priority to the provisional Appl. Ser. No. 61/199,254 filed on Nov. 15, 2008, the entire content of which is hereby incorporated by reference.

FIELD OF THE INVENTION

This invention generally relates to technologies for visual navigational aids, and more specifically to a precision approach path indicator (PAPI) system using light emitting diode (LED) as lighting source, which offers a combination of long life time, low cost, high luminous power, compact size, and high reliability.

BACKGROUND OF THE INVENTION

The Precision Approach Path Indicator (PAPI) provides the pilot with a safe and accurate glide slope on landing approach to the runway. A typical PAPI system consists of four Light Housing Assemblies (LHA's), placed in a row perpendicular to the approach path. Each LHA sends out a beam of light which is usually white above the central horizontal axis and red below the axis. Two LHAs are aimed at either slightly higher than the landing approach angle and two LHAs are aimed at slightly lower. From the pilot perspective, the PAPI appears as combinations of red and white to indicate a path that is too high, too low or correctly on slope. The US Federal Aviation Administration (FAA) has issued strict standard for PAPI systems in the form AC 150/5345-28F and FAA_E_3007 document.

Incandescent, fluorescent or arc lamp based light sources have been employed in the previous disclosed PAPI system. Some examples can be found in U.S. Pat. No. 4,064,424 to Hergenrother, U.S. Pat. No. 4,183,078 to Kidd, U.S. Pat. No. 4,430,695 to Payne et al., and U.S. Pat. No. 4,532,512 to Tanner.

The lamp based PAPI system including those listed above suffers from a short life span of less than 2,000 hours. To solve this problem, laser based PAPI system has been introduced in U.S. Pat. No. 5,287,104 to Shemwell. In the system according to Shemwell, three differently-colored beams of laser light are produced and transmitted, one beam of laser light in a geometric plane containing the aircraft approach direction, another beam to one side of the geometric plane, and the third beam on the other side. The pilot can determine whether the aircraft is on the geometric plane or to which side by the color of the light received. If desired, at least one of the colored laser beams that is transmitted toward one side of the geometric plane can be broken into a plurality of adjacent fan-shaped beams, the light in at least one of the fan-shaped beams being interrupted intermittently. However, the laser based VASI or PAPI apparatus typically suffer from high cost and low luminous power, or in other words, low brightness.

The US Patent Application No US2008/0007430 describes a visual navigational aid apparatus based on high intensity red and white LEDs. The two different colored light beams are projected to space separated through Fresnel lens and slotted aperture, thus providing approach guidance. While the high intensity LED apparatus solves the shortcomings associated with the laser based PAPI apparatus, this design suffers from the low imaging quality of Fresnel lens, low optical efficiency, and large overall system size.

Therefore a need exists for an improved PAPI system which offers a combination of long life time, low cost, high luminous power, compact size, and high reliability.

SUMMARY OF THE INVENTION

The present application discloses a new type of LED based light source and optical design for the Precision Approach Path Indicator (PAPI).

In the first preferred embodiment, each PAPI Light Housing Assembly (LHA) consists of one or more lighting assembly modules, electrically coupled to a power and control unit, and each lighting assembly module is made up of multiple red and white LEDs, multiple collimating lenses, one optical combiner, and one projection lens set.

From the lighting assembly module side view, the array of red LEDs are placed on top of the array of white LEDs, with a collimating lens in front of each of the LEDs. The optical combiner is in front of both the red and white LEDs, slightly above the white LEDs in vertical placement. The optical combiner is a six face lens including an input refractive surface facing the LEDs, a projection surface facing the projection lens, a flat top surface, a flat bottom surface having a reflective coating to block white light, and two side surfaces. The projection surface has a filter coating which is transparent with red light. The input refractive surface facing the LEDs is coated with a layer of anti-reflective materials. In addition, the input refractive surface is at an angle to the projection surface to prevent red light from being blocked by the collimating lens in front of the white LEDs. An edge of the bottom surface is curved to compensate field distortion from the output projection surface. The optical combiner position is adjustable vertically, backward and forward for optically alignment.

Each of the assembly modules further has a light blocker placed under the optical combiner and on the horizontal plane between the arrays of red LEDs and array of white LEDs. The light blocker is a flat non-transparent board. The projection lens set includes an achromatic lens and a cylindrical lens. The achromatic lens helps to reduce chromatic aberration, thereby reducing the white-red transition angle of the projected beam from LHA. The cylindrical lens helps to increase the intensity uniformity of the beam in horizontal direction. The optical combiner position is aligned to the focal point of the projection lens. The combined beam of light from white and red LEDs is projected out through the projection lens.

In the second preferred embodiment, the LED based PAPI system uses both visible light and infrared light for approach guidance. The system works either in visible light indication mode or infrared light indication mode. As with a typical system, the PAPI includes four LHAs and each includes one or more lighting assembly modules. The lighting assembly module includes Infrared (IR) LEDs, in addition to the components as described in the first preferred embodiment. There are two arrays of IR LEDs, placed above and below the optical combiner. The first array of IR LEDs is configured to work at flash mode, and the second array is configured to work at steady burn mode.

The optical combiner is also modified. The top surface is transparent with IR. The projection surface has a filter coating which is transparent with red light and infrared light. The input refractive surface is transparent with visible wavelength but reflective with infrared light.

The LED based Precision Approach Path Indicator system according to the present invention offers a combination of long life time, low cost, high luminous power, compact size, and high reliability, and meets substantially all the regulatory specifications and requirements such as the new FAA_E_ 3007 by US Federal Aviation Administration (FAA).

DETAILED DESCRIPTION OF THE INVENTION

Figure 1:
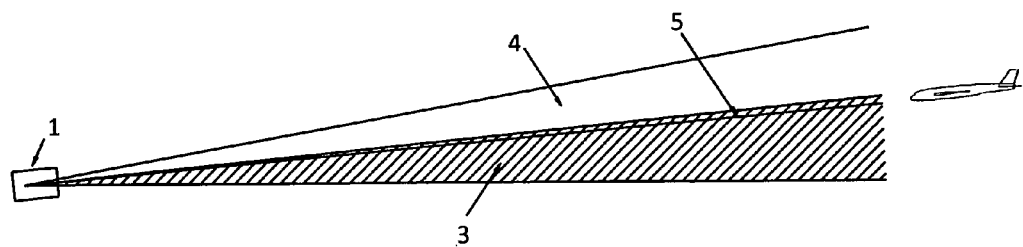
FIG. 1 illustrates a side view of a LED based precision approach path indicator (PAPI) deployment.

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

In the specification and the claims of this application, (1) LED refers to light emitting diode; (2) LEDs refers to light emitting diodes; (3) PAPI refers to precision approach path indication; (4) LHA refers to light housing assembly; (5) LHAs refers to light housing assemblies; and (6) IR refers to infrared light.

The LED based precision approach path indication (PAPI) system for guiding a landing aircraft to a pre-determined approach path according to the present invention includes multiple light housing assemblies (LHAs). Each of the LHAs includes one or more lighting assembly modules. Each of the assembly modules includes: an array of white LEDs, an array of red LEDs positioned above the array of white LEDs, a plurality of collimating lens, each being placed in front of each of the LEDs, an optical combiner being placed in front of the array of red LEDs and being slightly above a first plane where the array of white LEDs are placed; and a projection lens set which is positioned in front of the optical combiner. The optical combiner is a six face lens including an input refractive surface facing the LEDs, an output projection surface facing the projection lens set, a flat top surface, and a flat bottom surface having a reflective coating to block white light and increase white light intensity near transition zone, the output projection surface having a filter coating which is transparent with red light. Each of the lighting assembly modules may further includes a light blocker being placed under the optical combiner and being placed between the first plane and a second plane where the array of red LEDs are placed, the light blocker being a flat non-transparent board. The projection lens set includes an achromatic lens and a cylindrical lens. The optical combiner input refractive surface is at an angle to the output projection surface to prevent red light from being blocked by the collimating lens in front of the white LEDs. In some applications when the transition angle requirement is critical, i.e., the white-red transition angle must be very narrow, the edge of the bottom surface of the optical combiner is curved in order to compensate field distortion caused by the projection lens, thereby rendering a clear projected image and a narrow white-red transition angle. In other applications, when the transition angle requirement is not critical, the edge of the bottom surface can be straight such that field distortion is not compensated. The projection lens set may be a single convex lens without cylindrical lens if the transition angle requirement is not critical in some applications. The optical combiner is adjustable vertically, backward and forward such that all lighting assembly modules can be optically aligned. The optical combiner input refractive surface is anti-reflective coated. Each of the LHAs may further includes two electronic incline angle sensors and meters that display the LHA's vertical and horizontal angles and a controller that shuts down the light source whenever a measurement of angle falls outside of a tolerance range. Each of the LHAs includes at least two lighting assembly modules, and wherein at least two lighting assembly modules are set at a same angle vertically, but a different angle horizontally to smooth horizontal light intensity distribution and to increase reliability.

Figure 2:
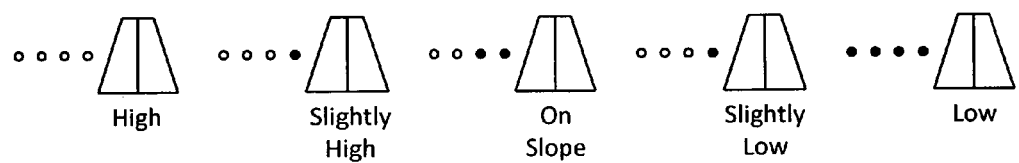
FIG. 2 illustrates the PAPI signals provided by four LED indicators installed in the left of a runway, from which the pilot sees different combinations of white and red light colors, each combination indicating a flight height relative to the pre-determined approach path.

As shown in FIG. 1, the LED based PAPI system LHA 1 projects a beam of light, divided into three zones from high to low—white light zone 4, transition zone 5, and red light zone 3. According to FAA and international standards, the angle of the transition zone 5 must be less than few minutes. As shown in FIG. 2, based on the color combination of the four LHA indicators, which are set at different aiming angles, the pilot of aircraft can determine the height relative to the pre-determined approach path—high, slightly high, on slope, slightly low, low. When the pilot sees four white indicators, the aircraft is too high; three white indicators and one red indicator means the aircraft is slightly high; two white indicators and two red indicators means the aircraft is on the correct slope; one white indicator and three red indicators means aircraft is slightly low; and four red indicators means that the aircraft is too low.

Figure 3:
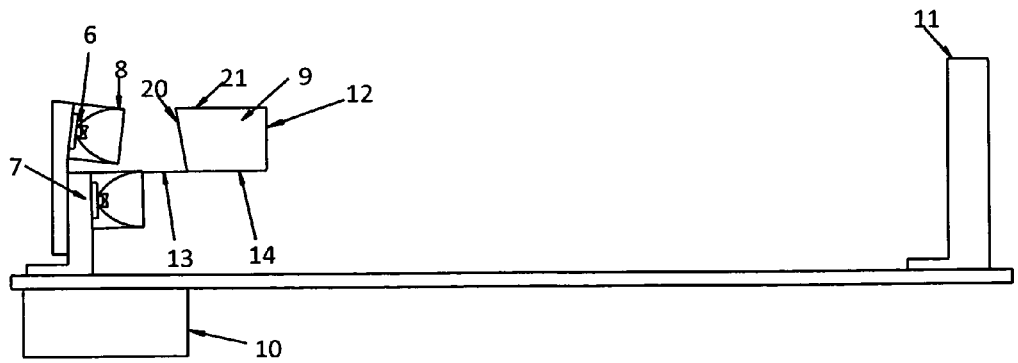
FIG. 3 is a block diagram illustrating a side view of the LED indicator assembly module according to the invention.
Figure 4:
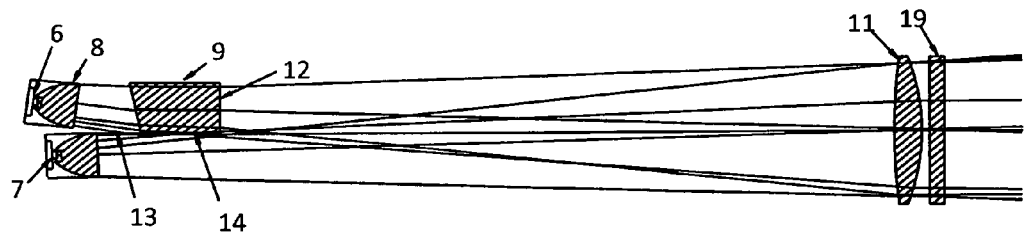
FIG. 4 is a schematic diagram illustrating a side view of the optical design and the light path of the LED indicator assembly module according to FIG. 3.
Figure 5:
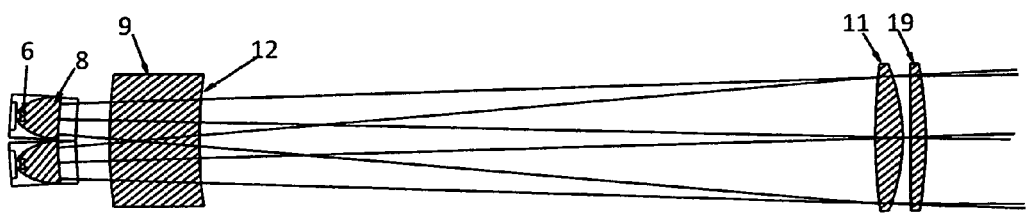
FIG. 5 is a schematic diagram illustrating a top view of the optical design and the light path of the LED indicator assembly module according to FIG. 3.

The most important part of this invention, i.e., the LED lighting assembly module, is shown in FIGS. 3-5. FIG. 3 is a block diagram illustrating a side view of the LED indicator assembly module according to the invention. FIG. 4 is a schematic diagram illustrating a side view of the optical design and the light path of the LED indicator assembly module according to FIG. 3. FIG. 5 is a schematic diagram illustrating a top view of the optical design and the light path of the LED indicator assembly module according to FIG. 3. LED lighting assembly module includes a plurality of red LEDs 6 and a plurality of white LEDs 7. Both the red and the white LEDs are arranged in array. The light from each LED passes through the collimating lens 8 in front of each LED. There is an optical combiner 9 which includes a bottom reflective surface 14, a top refractive surface 21, a projection surface 12 which is a refractive surface with red light filter coating, and an input refractive surface 20 which faces the red LEDs. The optical combiner 9 combines light from all LEDs to form a single beam of light. The light beam is projected through a projection lens set 11, which images the lower edge of the optical combiner's reflective surface 14 to infinity. The projection lens set 11 is made up of an achromatic lens and a cylindrical lens to ensure white light projection quality in vertical and uniformity in horizontal. The reflective surface 14 can separate red light and white light and create a very narrow transition zone.

The lighting assembly module may further include a light blocker 13, which together with the red light filter coating of the projection surface 12, functions to reduce the interference by the scattered light. There is an angle between the two refractive surfaces 20 and 12 of the optical combiner 9 to prevent the red light from being blocked by the white LED's collimating lens. The edge of the reflective surface 14 is curved to compensate field distortion from the projection lens 11. In order to achieve the optimal result, the position of optical combiner 9 needs to be adjustable vertically, backward, and forward. The mounting frame of the optical combiner 9 includes screws to adjust the positions. The collimating lens 8 is specially designed for LED, with high efficiency rating of 80-90%.

The typical PAPI requires white light intensity of greater than 30,000 candelas, which may not be met with LEDs in one assembly module alone. Several lighting assembly modules may be electrically coupled to a power and control unit. All assembly modules' transition zones in an LHA must be set at the same angle to have an overall clear separation of the red and white light zone and meet the relevant requirement in FAA and international standards.

Figure 6:
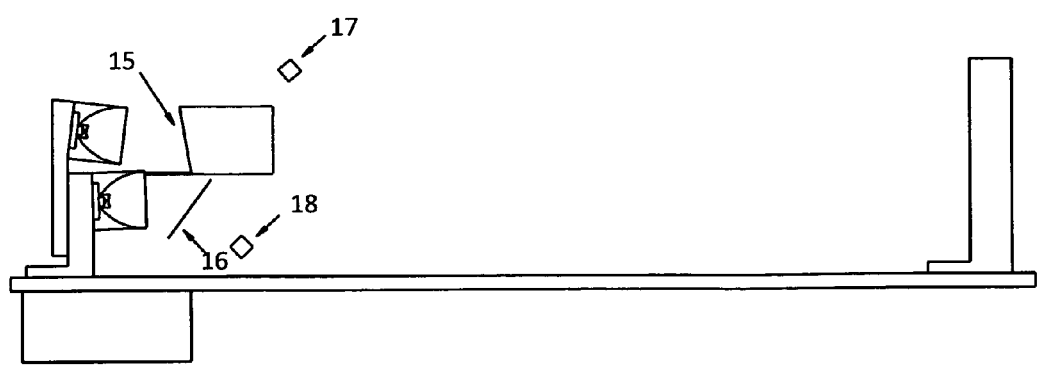
FIG. 6 is a schematic diagram illustrating a LED indicator assembly module with infrared light (IR) capability.

The PAPI system according to the invention works with both visible light and infrared (IR) light as shown in FIG. 6. 11. The PAPI system using visible light indication and/or infrared (IR) indication includes multiple light housing assemblies (LHAs). Each of the LHAs includes one or more lighting assembly modules. Each of the assembly modules includes: an array of white LEDs; an array of red LEDs positioned above the array of white LEDs; a plurality of collimating lens, each being placed in front of each of the LEDs; an optical combiner being placed in front of the array of red LEDs and being slightly above a first plane where the array of white LEDs are placed; a projection lens set which is positioned in front of the optical combiner; a first array of IR LEDs placed above the optical combiner; and a second array of IR LEDs placed under the optical combiner. The optical combiner is a six face lens includes an input refractive surface facing the LEDs, an output projection surface facing the projection lens, a top surface transparent with IR, and a flat bottom surface having a reflective coating to block white light and IR from the second array of IR LEDs. The output projection surface has a filter coating which is transparent with red light and IR. The input refractive surface is transparent with visible wavelength but reflective with IR. The first array of IR LEDs is configured to work at flash mode, and the second array of IR LEDs is configured to work at steady burn mode. Each of the lighting assembly modules further includes a light blocker being placed under the optical combiner and being placed between the first plane and a second plane where the array of red LEDs are placed, the light blocker being a flat non-transparent board. The projection lens set includes an achromatic lens and a cylindrical lens. The optical combiner input refractive surface is at an angle to the output projection surface to prevent red light from being blocked by the collimating lens in front of the white LEDs. The optical combiner bottom surface edge is curved to compensate field distortion from the projection lens, or straight if the transition angle request is not critical. The projection lens set may be a single convex lens without cylindrical lens if the transition angle request is not critical. The optical combiner is adjustable vertically, backward and forward such that all lighting assembly modules can be optically aligned. The optical combiner input refractive surface is coated with anti-reflective for red and reflective for IR. Each of the LHAs further includes two electronic incline angle sensors and meters that display the LHA's vertical and horizontal angles and a controller that shuts down the light source whenever a measurement of angle falls outside of a tolerance range. Each of the LHAs includes at least two lighting assembly modules, and wherein the at least two lighting assembly modules are set at a same angle vertically, but a different angle horizontally to smooth horizontal light intensity distribution and to increase reliability.

Now referring to FIG. 6, several IR LEDs 17-18 are separated into two groups. The IR LEDs are arranged into array. The IR LEDs in group 17 work in flash mode and the IR LEDs in group 18 work at steady burn mode. The LED facing input refractive surface 20 of the optical combiner 9 has a coating 15 which is transparent with visible wavelength but reflective with IR. In addition, the system includes a beam combiner 16 which is also transparent with visible wavelength light but reflective with IR light.

Every LED indicator includes an electronic incline an angle sensor and the incline angle can be automatically measured and displayed on a meter. This is to aid in the placement and setup of the LHA. The incline angle measured from LHA is sent to a computer based controller. If the measurement falls outside of tolerance range, the controller shuts down the LEDs, to avoid giving false PAPI signal.

If the operating temperature of the LED rises too high, efficiency and life time are reduced. A heat sink 10 is used to reduce the LEDs' temperature. Some incline angle sensors are also significantly affected by the operating environment temperature, especially under 0° C. In order to meet the required precision, a circuit comprising of a thermistor, resister, and amplifier, is used to compensate the temperature caused sensor variance.

For optimal performance, a cylindrical lens 19 may be included in the projection lens 11 which is placed after the achromatic lens in the above described embodiments.

While one or more embodiments of the present invention have been illustrated above, the skilled artisan will appreciate that modifications and adoptions to those embodiments may be made without departing from the scope and spirit of the present invention.

What is claimed is:

1. An LED based precision approach path indication (PAPI) system for guiding a landing aircraft to a pre-determined approach path comprising of multiple light housing assemblies (LHAs), each of the LHAs comprising of one or more lighting assembly modules, wherein each of the lighting assembly modules comprises: an array of white LEDs; an array of red LEDs positioned above said array of white LEDs; a plurality of collimating lens, each being placed in front of each LED of said array of white LEDs and said array of red LEDs; an optical combiner being placed in front of said array of red LEDs and being slightly above a first plane where said array of white LEDs are placed; and a projection lens set which is positioned in front of said optical combiner; wherein said optical combiner is a six face lens comprising an input refractive surface facing said LEDs, an output projection surface facing said projection lens set, a flat top surface, and a flat bottom surface having a reflective coating to block white light and increase white light intensity near transition zone, said output projection surface having a filter coating which is transparent with red light.

2. The LED based PAPI system according to claim 1, wherein each of said lighting assembly modules further comprises a light blocker being placed under said optical combiner and being placed between said first plane and a second plane where said array of red LEDs are placed, said light blocker being a flat non-transparent board.

3. The LED based PAPI system according to claim 1, said projection lens set comprises an achromatic lens and a cylindrical lens.

4. The LED based PAPI system to claim 1, wherein said optical combiner input refractive surface is at an angle to said output projection surface to prevent red light from being blocked by said collimating lens in front of said white LEDs.

5. The LED based PAPI system according to claim 1, wherein edge of said optical combiner's bottom surface is curved in order to compensate field distortion caused by said projection lens if transition angle requirement is critical, or straight if the requirement is not critical.

6. The LED based PAPI system according to claim 1, wherein said projection lens set may be a single convex lens without cylindrical lens if neither transition angle nor intensity uniformity requirement is critical.

7. The LED based PAPI system according to claim 1, wherein said optical combiner is adjustable vertically, backward and forward such that all lighting assembly moduless can be optically aligned.

8. The LED based PAPI system according to claim 1, wherein said optical combiner input refractive surface is anti-reflective coated.

9. The LED based PAPI system according to claim 1, wherein each of the LHAs further comprises two electronic incline angle sensors and meters that display the LHA's vertical and horizontal angles and a controller that shuts down said light source whenever a measurement of angle falls outside of a tolerance range.

10. The LED based PAPI system according to claim 1, wherein the LHA adds an array of green LEDs with collimate lenses and an optical combiner between the white LEDs and red LEDs vertically; the output beam from LHA becomes white-green-red beam; wherein this LHA can be used for Heliport Approach Path Indicator (CHAPI); wherein the LHA change white LEDs to green LEDs; make the green LEDS and red LEDs flash; add an array of green LEDs and array of red LEDs and two optical combiners between the flashing green LEDs and red LEDs vertically; the additional LEDs do not flash, wherein this LHA can be used as a Helicopter Approach Path Indicator (HAPI).

11. A LED based Precision Approach Path Indication (PAPI) system using visible light indication and/or infrared (IR) indication comprising of multiple light housing assemblies (LHAs), each of the LHAs comprising of one or more lighting assembly modules, wherein each of the lighting assembly modules comprises: an array of white LEDs; an array of red LEDs positioned above said array of white LEDs; a plurality of collimating lens, each being placed in front of each LED of said array of white LEDs and said array of red LEDs; an optical combiner being placed in front of said array of red LEDs and being slightly above a first plane where said array of white LEDs are placed; a projection lens set which is positioned in front of said optical combiner; a first array of IR LEDs placed above said optical combiner; and a second array of IR LEDs placed under said optical combiner; wherein said optical combiner is a six face lens comprising an input refractive surface facing said LEDs, an output projection surface facing said projection lens, a top surface transparent with IR, and a flat bottom surface having a reflective coating to block white light and IR from said array of white LEDs and second array of IR LEDs; wherein said input refractive surface is transparent with visible wavelength but reflective with IR; wherein said first array of IR LEDs are configured to work at flash mode; and wherein said second array of IR LEDs are configured to work at steady burn mode.

12. The LED based PAPI system according to claim 11, wherein each of said lighting assembly modules further comprises a light blocker being placed under said optical combiner and being placed between said first plane and a second plane where said array of red LEDs are placed, said light blocker being a flat non-transparent board.

13. The LED based PAPI system according to claim 11, wherein said projection lens set comprises an achromatic lens and a cylindrical lens.

14. The LED based PAPI system according to claim 11, wherein said optical combiner input refractive surface is at an angle to said output projection surface to prevent red light from being blocked by said collimating lens in front of said white LEDs.

15. The LED based PAPI system according to claim 11, wherein edge of said optical combiner's bottom surface is curved in order to compensate field distortion caused by said projection lens if a transition angle requirement is critical, or straight if the requirement is not critical.

16. The LED based PAPI system according to claim 11, wherein said projection lens set may be a single convex lens without cylindrical lens if neither transition angle nor intensity uniformity requirement is critical.

17. The LED based PAPI system according to claim 11, wherein said optical combiner is adjustable vertically, backward and forward such that all lighting assembly modules can be optically aligned.

18. The LED based PAPI system according to claim 11, wherein said optical combiner input refractive surface is coated with anti-reflective for red and reflective for IR.

19. The LED based PAPI system according to claim 11, wherein each of the LHAs further comprises two electronic incline angle sensors and meters that display the LHA's vertical and horizontal angles and a controller that shuts down said light source whenever a measurement of angle falls outside of a tolerance range.

20. The LED based PAPI system according to claim 11, wherein each of the LHAs comprises at least two lighting assembly modules, and wherein said at least two lighting assembly modules are set at a same angle vertically, but a different angle horizontally to smooth horizontal light intensity distribution and to increase reliability.

* * * * *